United States Patent Office 3,193,380
Patented July 6, 1965

3,193,380
URANIUM GALLIUM ALLOYS AND
METHOD OF PREPARATION
Walter D. Wilkinson, Maywood, and Le Roy R. Kelman, Chicago, Ill., assignors to the United States of America as represented by the United States Atomic Energy Commission
No Drawing. Filed Aug. 12, 1949, Ser. No. 110,034
7 Claims. (Cl. 75—84.1)

This invention deals with uranium-gallium alloys and the method of preparing same.

It is an object of this invention to prepare uranium-rich alloys which are not attacked by gallium.

It is another object of this invention to provide uranium-gallium alloys which are suspendible in liquid gallium especially for use as a coolant in a power-producing neutronic reactor.

It is still another object of this invention to provide uranium-gallium alloys which when suspended in gallium remain in that condition for a long time and settle with a remarkably low speed.

These and other objects are accomplished by mixing uranium or uranium containing material with gallium, heating the mixture to at least 350° C., preferably to from 400 to 800° C., for several hours, advantageously in a protective atmosphere such as argon gas. The reaction product then obtained consists of a liquid phase which contains substantially pure gallium in which solid crystals are suspended; these crystals consist of a uranium-gallium compound embedded in a gallium phase. Elementary uranium shows practically no solubility in the gallium so that at slightly above room temperature the gallium is free from uranium; however, the solubility is slightly dependent upon the temperature and increases when it is raised. At elevated temperatures up to 0.3% uranium was found in the liquid gallium.

The solid crystals formed during the heating period were separated from the liquid phase by filtration through sintered glass; they were examined and the compound was found to be either $UGa_2$ or $UGa_3$, depending upon the reaction temperature used. It has been found that if the reaction temperature used ranged from 350° to 600° C., $UGa_2$ was obtained, whereas closer to 800° C. $UGa_3$ was formed.

These determinations were made by examining the crystals in X-ray diffraction. For this purpose, in one instance, a mixture of 23.9% by weight of uranium and 76.1% of gallium was heated for two days at 800° C., and the crystals obtained were then separated by filtration from the liquid gallium. The X-ray diagrams showed that the compound in the crystals was of the cubic system and that the lattice constant was 4.24±0.01 A. It was found that the structure of the compound was that of $AuCu_3$ type and that the compound was isomorphous with $USi_3$ and $UAl_3$. Each uranium atom was found to be bonded to 12 gallium atoms with the distance U-Ga=2.99 A.; each gallium atom was found to be bonded to 4 uranium atoms and to 8 gallium atoms with a Ga-Ga distance of 2.99 A. The density of $UGa_3$ was calculated to be 9.67.

In another instance a uranium-gallium alloy was prepared by heating a mixture of 26.4% by weight of uranium and 73.6% by weight of gallium at 600° C. for two days. Again solid crystals were found suspended in the excess gallium and separated therefrom. X-ray measurement showed the gallium-uranium compound to be of the tetragonal system with a body-centered translation lattice and 4 molecules per unit cell. The lattice periods were $A_1$=4.238±0.001 A. and $A_3$=14.664±0.003 A. The compound was found to be isomorphous with $ThSi_2$, $USi_2$, $PuSi_2$ and $CeSi_2$. Each uranium atom was found to be bonded to 12 gallium atoms with a distance of U-Ga=3.23 A. and each gallium atom to be bonded to 6 uranium atoms and to 3 gallium atoms with a distance of Ga-Ga=2.44 A. The density was calculated to be 9.45.

Both types of crystals, namely those containing $UGa_2$ and those containing $UGa_3$ remained suspended in gallium for a long period of time. Their speed of settling, for instance at a temperature of 400° C., was found to be as slow as 1 inch per week.

Instead of starting out with metallic uranium, it has been found highly advantageous to use uranium hydride. For this purpose the uranium hydride and gallium were mixed and the mixture was then heated. A protective atmosphere of argon was not necessary, because the hydrogen which developed provided a sufficiently protective atmosphere. The hydrogen was removed by applying reduced pressure. It was noticed that the hydride was not wetted by, and did not react with, the gallium but that as the hydride decomposed and the elementary uranium was formed, it was wetted by the gallium and reacted therewith in statu nascendi.

It will be understood that the invention is not limited to the specific details given in the specification but that it can be modified in accordance with the scope of the appended claims.

What is claimed is:

1. A method of preparing a relatively stable suspension of a uranium-containing material in gallium comprising heating uranium and gallium in a proportion of from 23.9 to 26.4% by weight of uranium and the remainder being gallium to at least 350° C. whereby uranium-gallium compound crystals form and are suspended in gallium.

2. A method of preparing a relatively stable suspension of a uranium-containing material in gallium comprising heating uranium and gallium in a proportion of from 23.9 to 26.4% by weight of uranium and the remainder being gallium to from 350 to 600° C. whereby $UGa_2$ crystals form and are suspended in gallium.

3. A method of preparing a relatively stable suspension of a uranium-containing material in gallium comprising mixing uranium hydride and gallium in a proportion corresponding to from 23.9 to 26.4% by weight of metallic uranium and from 76.1 to 73.6% by weight of gallium, heating the mixture to a temperature of from 400 to 800° C. while reducing the pressure whereby the hydride decomposes and forms uranium which in statu nascendi reacts with the gallium to form uranium-gallium compound crystals suspended in metallic gallium.

4. A heterogeneous composition of matter comprising crystals of a gallium-uranium compound selected from the group consisting of $UGa_2$, $UGa_3$ and a mixture of $UGa_2$ and $UGa_3$ suspended in gallium, the all-over proportion of uranium and gallium in said suspension ranging from 23.9 to 26.4% by weight of uranium and from 76.1 to 73.6% by weight of gallium.

5. The composition of matter of claim 4 wherein the compound is $UGa_2$.

6. The composition of matter of claim 4 wherein the compound is $UGa_3$.

7. A method of preparing a relatively stable suspension of uranium-containing material in gallium comprising heating uranium and gallium in a proportion of from 23.9 to 26.4% by weight of metallic uranium and from 76.1 to 73.6% by weight of gallium to from 600 to 800° C. whereby $UGa_3$ crystals are formed and suspended in gallium.

References Cited by the Examiner

Little, Text-Book of Inorganic Chemistry, vol. 4, published 1917 by Charles Griffen and Co., Ltd., London (pp. 143–149).

Chemical Abstracts, vol. 41, Oct.–Nov. 1947, col. 6488i.

United States Atomic Energy Commission, Report MDDC–1604, "The Evaporation of Gallium," by Haynes, Apr. 2, 1947, page 1.

United States Atomic Energy Commission, Report A.E.C.D.–2388, "The Structure of Some Metal Compounds of Uranium," by Rundle et al., Nov. 10, 1948, pp. 1 and 2.

CARL D. QUARFORTH, *Primary Examiner.*

ROGER L. CAMPBELL, WILLIAM G. WILES, JAMES L. BREWRINK, *Examiners.*